March 29, 1960 R. ABRAMS 2,931,007
ELECTRIC INSULATING DEVICES
Filed April 18, 1956 2 Sheets-Sheet 1

Inventor
Ralph Abrams
by Roberts Cushman & Grover
Att'ys

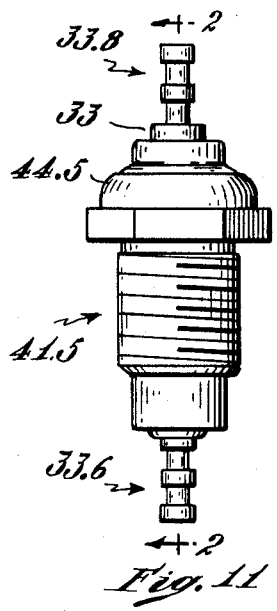
Fig. 11
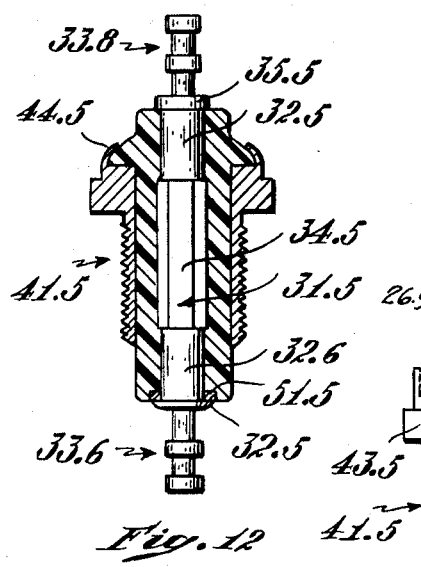
Fig. 12
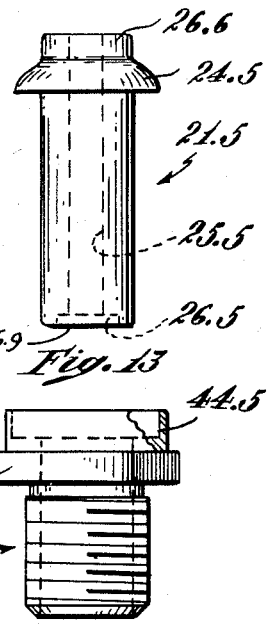
Fig. 13
Fig. 14
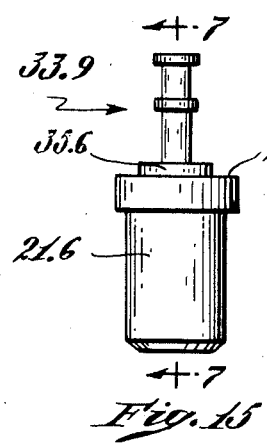
Fig. 15
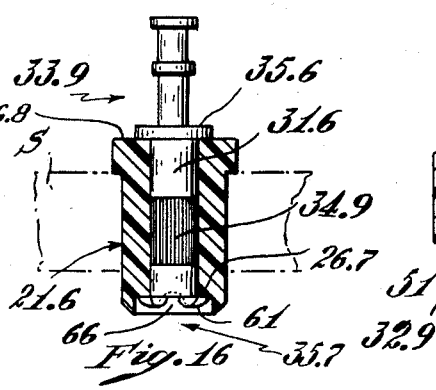
Fig. 16
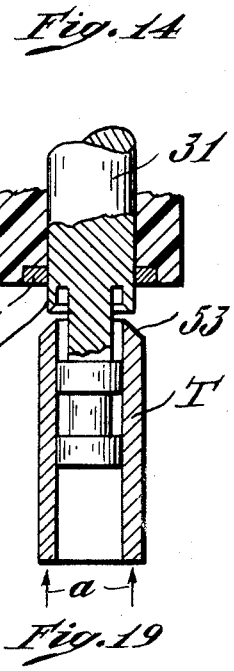
Fig. 19
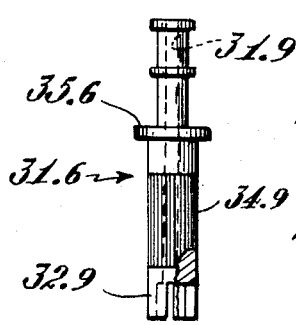
Fig. 18
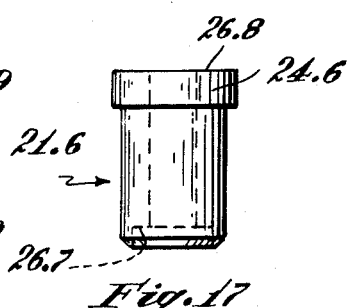
Fig. 17
Inventor
Ralph Abrams
by Roberts Cushman & Grover
Attys.

United States Patent Office 2,931,007
Patented Mar. 29, 1960

2,931,007

ELECTRIC INSULATING DEVICES

Ralph Abrams, Sharon, Mass., assignor to Cambridge Thermionic Corporation, Cambridge, Mass., a corporation of Massachusetts Application April 18, 1956, Serial No. 579,043

3 Claims. (Cl. 339—213)

This invention relates to insulated devices for use in electrical installations, of the lead-through type which can be mounted in apertures of supports such as panels and which is capable of receiving therewithin contact means such as soldering lugs or jacks.

Objects of this invention are to provide devices of the above type which are especially suited for the use of superior insulating materials of the types which have little elastic tendency to return to an original shape after having been deformed but have a comparatively high tendency to flow, so that such materials are ill suited for incorportaion in conventionally designed devices of this type, to provide improved insulated assemblies of the lead-through type which incorporate insulating material of the above type and which nevertheless lend themselves for assembly with metal parts according to conventional mass production techniques, to provide such devices which can be manufactured with a minimum amount of molding, machining and assembly operations, to provide a jack assembly which provides for tight and positive connection which is at the same time easily removed and which firmly engages its plug for a long time without danger of loosening and with practically no contact resistance, to provide such devices that can be easily assembled or mounted on panels of widely varying type and thickness, and to provide insulated assemblies of this type which lend themselves especially well to miniaturizing.

Briefly stated by way of a summary indicating its nature and substance, the invention comprises an essentially cylindrical body having a central bore and two thrust faces, this body being made from a synthetic insulating material of the type that has little elasticity and low internal friction namely, as mentioned above, is of the type which has little elastic tendency to return to an original shape after having been deformed but has a compartively high tendency to flow, this body being combined with a metallic conductor contact, or terminal means that etxends through the bore of the cylindrical body, has a preformed flange resting on one of the faces of the body, and has a second flange that is upon assembly pressurably formed such as by flaring, swaging or staking an edge or ridge over the other face, such that between the faces and flanges the conductor is under tension and the body under compression; in this fashion the body is firmly secured to the conductor means essentially without the possibilities of loosening due to the low elasticity of the body and of separation due to unconfined flowing of the body around metal components. The body can be fastened to a support either by means of a metal sleeve confined to the outside thereof, or by means of pressing the body itself into an aperture that is somewhat smaller than its outside diameter. In an important practical aspect of the invention that flange of the metallic conductor means which is pressurably formed and flared during assembly over a face of the insulating body has radial cutouts into which the insulating material penetrates when the flange is flared over the face of the body, so that the metal conductor means and the body are especially well secured against relative rotation. It was found that these peculiarities of construction are especially suited to accomplish the above stated object of providing a securely joined combinaiton of elongate metal parts and of bodies of electrically superior but mechanically difficult insulating material.

These and other objects and aspects of novelty of the invention will appear from the following description of several typical embodiments thereof illustrating its novel characteristics. This description refers to a drawing in which.

Figure 1:
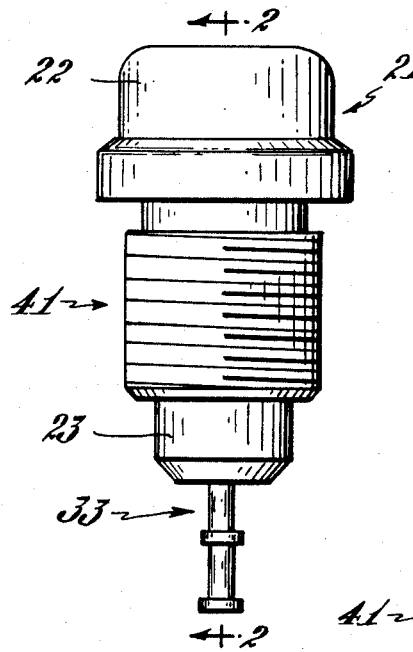
Fig. 1 is a side elevation of a jack assembly according to the invention.
Figures 8, 9:
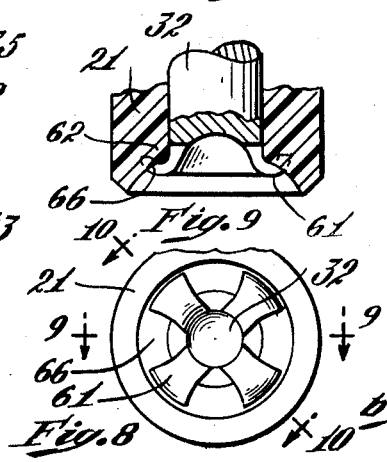
Fig. 8 is an axial view of the flared flange portion shown in Fig. 2 after assembly.
Figure 10:
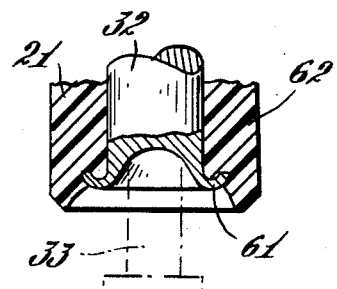

Figs. 9 and 10 are sections through the flared flange portion of the assembly, on lines 8—8 and 9—9 respectively of Fig. 8;

Fig. 11 is an elevation, similar to Fig. 1, of a solder lug lead-through assembly according to the invention;

Fig. 12 is an axial section through the assembly according to Fig. 11;

Fig. 13 is an elevation of the insulating body used in the assembly according to Figs. 11 and 12;

Fig. 14 is an elevation partly in section of the sleeve on the outside of the assembly according to Figs. 11 and 12;

Fig. 15 is a side elevation similar to Figs. 1 and 11 of a single solder lug assembly according to the invention;

Fig. 16 is an axial section through the assembly according to Fig. 15;

Fig. 17 is an elevation of the insulating body used in the assembly according to Figs. 15 and 16;

Fig. 18 is an elevation of the metal conductor means used in the assembly according to Figs. 15 and 16; and Fig. 19 is an axial section depicting the manner in which the flange of the metallic conductor means is formed by flaring a ridge over a face of the insulating body, by means of a tool which is also shown in section.

Figs. 1 to 7 illustrate an embodiment of the invention taking the form of a jack or plug receptacle for mounting on a board or panel and having a soldering lug on the side opposed to that from which the plug can be inserted. In these figures, numeral 21 designates the insulating body, 31 the metallic conductor means that extends through the bore of the insulating body, and 41 the metallic mounting sleeve which surrounds the insulating body.

Figure 5:
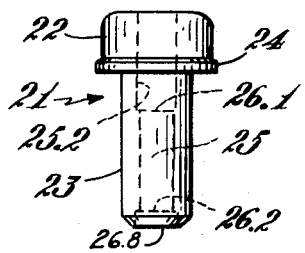
Fig. 5 is an elevation of the insulating body which is part of the assembly according to Figs. 1 and 2.

The insulating body, shown separately in Fig. 5, is made of insulating material of the peculiar type for which, as mentioned above, the herein described construction is especially suited. This material comprises certain synthetic compounds which have particularly favorable electric properties, such as polyethylene, polymonochlorotrifluoroethylene and polytetrafluoroethylene resins, commercially available under the trade names Alathon, Kel-F and Teflon, respectively. These materials exhibit peculiar properties which make them unsuitable for conventional assembly with metal components.

They are non-adhesive, inelastic in the sense that they have a "poor memory," and of comparatively low viscosity in the sense that they have little internal friction so that they are easily deformable and have a tendency to flow around obstructing surfaces. The present invention utilizes the easy flow characteristics of such materials for purposes of a pressurable assembly technique and at the same time avoids the detrimental effects of the flow phenomenon by correlating insulating bodies made of these synthetic materials with metal components in such a manner that these properties are taken advantage of, while the construction according to the invention avoids the detrimental effects which these properties have in conventional devices of this type.

As shown in Fig. 5, the insulating body has two cylindrical portions, one designated 22 of larger diameter than the somewhat longer portion 23. The two portions are separated by a chamfered flange 24. The central bore 25 is countersunk in such a manner that two thrust faces 26.1 and 26.2 are formed. The face 26.2 is not necessarily countersunk and can be formed by the end face of the body 21, as indicated at 26.8.

Figure 3:
Fig. 3 is a top view of the jack portion of the assembly according to Figs. 1 and 2.
Figure 4:
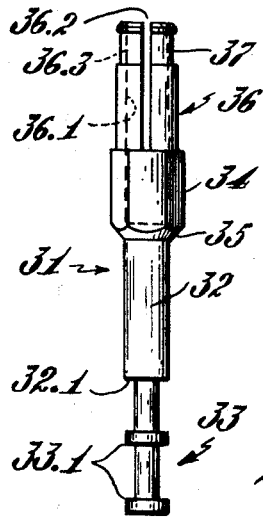
Fig. 4 is an elevation of the jack portion according to Fig. 3.
Figure 7:
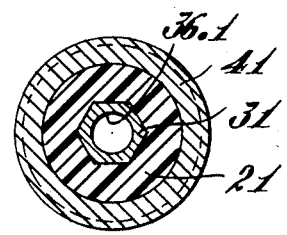
Fig. 7 is a section on lines 7—7 of Fig. 2.

The metallic terminal, conductor and receptacle 31, individually shown in Figs. 3 and 4, has a round shank portion 32, and extending from one end thereof a solder lug portion 33 of reduced diameter with a conventional flange or flanges 33.1. On the other end of the cylindrical portion 32 extends an at least partly flat, in this case for example hexagonal, rotation preventing portion 34 which leads into the round portion 32 with a flange or shoulder portion 35. The outside, edgewise diameter of the non-circular or flattened portion 34 is somewhat greater than the corresponding inside diameter of the insulator body, so that upon assembly the edges of the former will engage the wall of the latter. Integral with the hexagonal or otherwise flattened portion 34 is a receptacle portion 36 which has a central recess 36.1 (Figs. 3, 4 and 7) and which is slotted for example by way of the two cross cuts indicated at 36.2 and 36.3. The jack portion has further recessed end portion 37 forming a neck to which is applied a suitable spring means, such as the beryllium copper compressing ring 38 shown in Fig. 2.

Figures 2, 6:
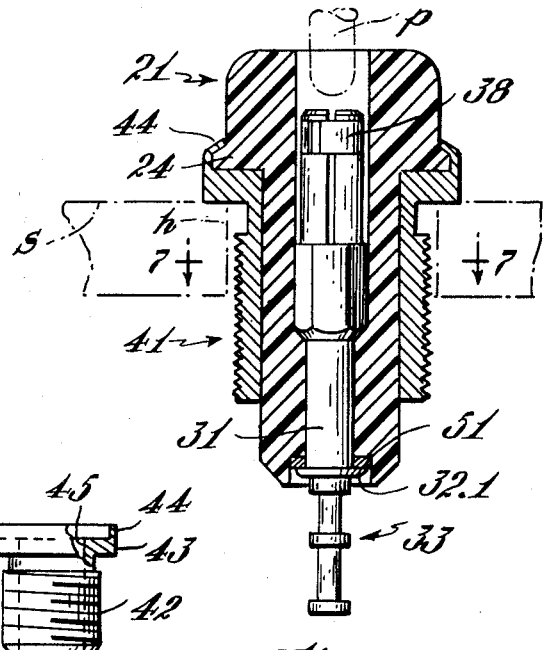
Fig. 2 is an axial section of the assembly according to Fig. 1.
Fig. 6 is a side elevation partly in section of the metal sleeve which likewise is part of the assembly according to Figs. 1 and 2.

The mounting sleeve 41, individually shown in Fig. 6 has a threaded portion 42, a flange 43 with a thin walled cylindrical rim 44. The diameter of the bore 45 is somewhat greater than the outside diameter of the cylindrical portion 23 of the insulator body 21.

Upon assembling, the insulator 21 is first inserted into the sleeve 41, and the rim 44 distorted over the flange 24 of the insulator body by means of a conventional staking tool, with the result indicated in Fig. 2. The metal body 31 is then pressed into the bore of the insulator 21, until the shoulder 35 is seated against the flange 26.1. The edges of the hexagonal section 34 (Figs. 2 and 4) are thus pressed into the inside of the larger bore portion 25.2 of the insulating body which is in turn pressed against the inside bore of the sleeve 41. With the face 35 of the metal body 31 seated against the face 26.1 of the insulating body 21, a washer 51 (Fig. 2) is inserted by slipping it over the flanges 33.1 (Fig. 4) until it touches the face 26.2. The edge 32.1 of the cylindrical portion 32 of the metal part 31 (Fig. 4) is then riveted, staked or swaged over the washer, by means of a simple tool, in the manner to be described below with reference to Fig. 19. This flaring of the edge of flange 32.1 over the washer 51, or directly over the face 26.2 of the insulator itself in the alternative manner to be described below, puts the shank portion 32 of the metal part 31 under tension and the insulator portion between faces 26.1, 26.2 under compression. The metal insert 31 and the insulating sleeve 21 being secured against relative rotation by means of the flattened portion 34, the insulating body is now firmly secured to the metal bodies 31 and 41 essentially without the possibilities of loosening due to the low elasticity of the body and of separation due to flowing of the insulating material.

The described device can now be mounted on a supporting structure, such as the panel s indicated in Fig. 2, by inserting it into the hole h of the panel and by then fastening it by means of a nut screwed onto the threaded portion 42 of the sleeve 41. Electric conductors can then be secured to the solder lug portion 33 and a plug p, indicated in Fig. 2, can be inserted in the receptacle portion 36 of the device.

In the embodiment illustrated in Figs. 11 to 14, the components are essentially the same as those of the previously described embodiment, with the difference that here the entire insulating body is under compression, this embodiment serving as a lead-through insulator. Instead of a receptacle portion, this embodiment has a second soldering lug 33.8 in addition to lug 33.6. Next to the lug 33.8 is a flange 35.5 and the body itself has a flattened such as hexagonal portion 34.5 within the insulating body 21.5 (Fig. 13). On each end of the hexagonal portion 34.5 is a round portion 32.5 and 32.6, respectively. The metal sleeve 41.5 (Fig. 14) is here shown with a hexagonal flange 43.5 permitting this device to be screwed into a threaded hole of a support. The insulating body 21.5 (Fig. 13) has here a smooth bore 25.5, countersunk at 26.5, and a flange 24.5. Its outer face 26.6 corresponds to the interior face 26.1 of the embodiment according to Fig. 5, and faces 26.5 and 26.9 correspond to faces 26.2 and 26.8 of Fig. 5, respectively.

The assembly of these components is quite similar to that described above with reference to Figs. 1 to 7, and can be modified in the manner to be described below with reference to Figs. 8 to 10. The flattened portion 34.5 prevents rotation between the insulating and metal bodies, the swaged over rim 44.5 engages the flange 24.5 of the insulating body 21.5, and the tension which is put on the metal component between flanges 32.5 and 35.5 (Fig. 12) puts the insulating body therebetween under compression, providing secure adherence between the various parts of the assembly.

The embodiment according to Figs. 15 to 18 differs from those described with reference to Figs. 11 to 14 in that the outer sleeve 41 is dispensed which is possible when the insulating body is comparatively short. In this instance the metallic insert 31.6 has a single soldering lug 33.9 next to the flange 35.6. The other flange 35.7 can be formed as above described or in the manner which will be described with reference to Figs. 16, 18 and 19. The insulating body 21.6 is quite similar to that shown in Fig. 13. Its flange 24.6 locates it with respect to the hole of a supporting panel s (Fig. 16) when the insulator is pressed thereinto. The faces 26.7 and 26.8 correspond to faces 26.5 and 26.6 of Fig. 13.

As indicated at 31.9 (Fig. 18) the insert can be tubular in order to facilitate the fastening thereto of a wire. The non-circular portion of the metal insert is here shown as a knurled portion 34.9.

Devices of the type shown in Figs. 15 and 18 are preferably used for pressing into holes of panels which holes are somewhat smaller than the outside diameter of the insulator body. The panel then serves the purpose of the sleeve 41 of the previously described embodiments.

A preferred construction for preassurably flaring a flange of the conductor part or insert will now be explained with reference to Figs. 18 and 19. Instead of being transversely cut off, the flange or shoulder or end portion of the metal insert can be shaped with a transverse recess, with or without an axial stud or lug, as shown in Figs. 19 and 18, respectively. Fig. 19 shows a metal insert of the type described with reference to Figs. 4 and 12 whereas the shape of Fig. 18 is derived from Fig. 19 by omitting the second solder lug.

Fig. 19 shows a flaring tool T which is pressed in the direction of arrows a against the firmly held metal insert 31. The inclined face 53 of the tool T flares the rim 32.9 outwardly and in axial direction, into the shape illustrated by Figs. 8 to 10.

Figs. 8 to 10 shows the above described pressurably flared flange and also modification of that construction.

While the flattened, such as hexagonal, portion of the metal insert, such as 34 of Fig. 4, is in many instances sufficient to prevent rotation between the metal insert and the insulating body it is often desirable, and especially so if the flattened insert portion is comparatively short or even omitted, to enhance or to replace the function of such flat portions with the following construction. The recessed ridge portion of the metal insert, such as shown at 32.9 of Figs. 18 and 19, is slotted such as by two radial cuts so that upon flaring the adjacent insulating material penetrates between the arms 61 of the star-shaped metal portions of the flared flange, as indicated at 66 of Figs. 8 and 9. The insulating material is pressed into the space under the flared arms 61, as indicated at 62 of Figs. 9 and 10. This interlocking of metal and plastic provides a very reliable construction for preventing axial as well as rotary movement between the metal and insulator parts of the assembly.

Fig. 10 indicates in dot and dash lines how this interlocking construction is applied to metal inserts having the shape of Fig. 19 after the ridge 32.9 has been flared out to flow over and into the plastic, by means of the tool T. Fig. 16 likewise shows this construction with arms 61 and slots 66. The washer 51 of Fig. 2 and the washer 51.5 of Fig. 12 are of course omitted if the construction according to Figs. 8 to 10 is used.

It should be understood that the present disclosure is for the purpose of illustration only and that this invention includes all modifications and equivalents which fall within the scope of the appended claims.

I claim:
1. An electrical insulating device, comprising: an essentially tube shaped cylindrical body having a single central bore and two thrust faces, and being made from a synthetic insulating material of the type that has little elasticity and low internal friction; and an elongate metallic conductor means extending through said bore, having a preformed flange resting on one of said faces, and a second flange that is pressurably flared over the other face, the thrust faces of said sleeve body and the flanges of said conductor means being approximately coextensive such that between said faces the conductor means is under tension and the insulating body under compression, the outer surface of said body being substantially smooth and continuously cylindrical at least so far as axially coextensive with the conductor means between said preformed flange and said preassurably flared out flange; whereby the body is firmly secured to the conductor means essentially without the possibilities of loosening due to the low elasticity of the body, of separation due to unconfined flowing thereof, and of weakening discontinuities of the compressed portion of the body between the flanges.

2. An electric insulating device, comprising: an essentially tube shaped cylindrical body having a single central bore and two thrust faces, and being made from a synthetic insulating material of the type that has little elasticity and low internal friction; an elongate metallic conductor means extending through said bore, having an at least partly non-circular axially extending shank portion which engages said central bore of the body, a preformed flange resting on one of said thrust faces, and a second flange that is pressurably flared over the other thrust face, the thrust faces of said sleeve body and the flanges of said conductor means being approximately coextensive such that between said faces the conductor means is under tension and the insulating body under compression; and a metallic mounting sleeve fitting the outside of said body substantially smoothly, encircling said shank portion, and being continuously cylindrical at least so far as axially coextensive with the conductor means between said preformed flange and said second flange; whereby the body is firmly secured to the conductor means essentially without the possibilities of loosening due to the low elasticity of the body, of separation due to unconfined flowing thereof, and of weakening discontinuties of the compressed portion of the body between the flanges.

3. An electric insulating device, comprising: an essentially tube shaped cylindrical body having a single central bore, two thrust faces and a peripheral ridge, and being made from a synthetic insulating material of the type that has little elasticity and low internal friction; an elongate metallic conductor means extending through said bore, having a preformed flange resting on one of said thrust faces, a second flange that is pressurably flared over the other thrust face, the thrust faces of said sleeve body and the flanges of said conductor means being approximately coextensive such that between said faces the conductor means is under tension and the insulating body under compression; and a metallic mounting sleeve fitting the outside of said body and having a rim which is folded over said ridge of said body, the outer surface of said body being substantially smooth and continuously cylindrical at least so far as axially coextensive with the conductor means between said preformed flange and said pressurably flared out flange; whereby the body is firmly secured to the conductor means essentially without the possibilities of loosening due to the low elasticity of the body, of separation due to unconfined flowing thereof, and of weakening discontinuities of the compressed portion of the body between the flanges.

References Cited in the file of this patent

UNITED STATES PATENTS

| | | |
|---|---|---|
| 439,043 | Stirckler | Dec. 21, 1890 |
| 1,559,683 | Douglas | Nov. 3, 1925 |
| 1,591,057 | Schwartz | July 6, 1926 |
| 1,914,651 | Reutter | June 20, 1933 |
| 2,405,897 | Milone et al. | Aug. 13, 1946 |
| 2,456,118 | Foster | Dec. 14, 1948 |
| 2,503,429 | Ziegler | Apr. 11, 1950 |
| 2,700,144 | Flanagan | Jan. 18, 1955 |
| 2,754,378 | Ohlheiser | July 10, 1956 |
| 2,782,491 | Cole | Feb. 26, 1957 |

FOREIGN PATENTS

| | | |
|---|---|---|
| 960,663 | France | Nov. 7, 1949 |

OTHER REFERENCES

Publication, "Dupont Product Engineering Bulletin," #50, 1954, page 7.